CHECK WORD SEQUENCES

| BIT # | A (X) k" | A (X) k' | B (XX) k" | B (XX) k' | C (XOX) k" | C (XOX) k' | D (XXX) k" | D (XXX) k' |
|---|---|---|---|---|---|---|---|---|
| 1 | X O O | O O O O X | X O X | O O O X X | X X O | O O X O X | X X X | O O X X X |
| 2 | O O X | O O O X O | O X X | O O X X O | X O O | O X O X O | X X O | O X X X O |
| 3 | O X O | O O X O O | X X X | O X X O O | O O X | X O X O O | X O O | X X X O O |
| 4 | X O X | O X O O O | X X O | X X O O O | O X O | O X O O X | O O X | X X O O X |
| 5 | O X X | X O O O O | X O O | X O O O X | X O X | X O O X O | O X O | X O O X X |
| 6 | X X X | O O O O X | O O X | O O O X X | O X X | O O X O X | X O X | O O X X X |
| 7 | X X O | O O O X O | O X O | O O X X O | X X X | O X O X O | O X X | O X X X O |
| 8 | X O O | O O X O O | X O X | O X X O O | X X O | X O X O O | X X X | X X X O O |
| 9 | O O X | O X O O O | O X X | X X O O O | X O O | O X O O X | X X O | X X O O X |
| 10 | O X O | X O O O O | X X X | X O O O X | O O X | X O O X O | X O O | X O O X X |
| 11 | X O X | O O O O X | X X O | O O O X X | O X O | O O X O X | O O X | O O X X X |
| 12 | O X X | O O O X O | X O O | O O X X O | X O X | O X O X O | O X O | O X X X O |
| 13 | X X X | O O X O O | O O X | O X X O O | O X X | X O X O O | X O X | X X X O O |
| 14 | X X O | O X O O O | O X O | X X O O O | X X X | O O O O X | O X X | X X O O X |
| 15 | X O O | X O O O O | X O X | X O O O X | X X O | X O O X O | X X X | X O O X X |
| 16 | O O X | O O O O X | O X X | O O O X X | X O O | O O X O X | X X O | O O X X X |
| 17 | O X O | O O O X O | X X X | O O X X O | O O X | O X O X O | X O O | O X X X O |
| 18 | X O X | O O X O O | X X O | O X X O O | O X O | X O X O O | O O X | X X X O O |
| 19 | O X X | O X O O O | X O O | X X O O O | X O X | O X O O X | O X O | X X O O X |
| 20 | X X X | X O O O O | O O X | X O O O X | O X X | X O O X O | X O X | X O O X X |
| 21 | X X O | O O O O X | O X O | O O O X X | X X X | O O X O X | O X X | O O X X X |
| 22 | X O O | O O O X O | X O X | O O X X O | X X O | O X O X O | X X X | O X X X O |
| 23 | O O X | O O X O O | O X X | O X X O O | X O O | X O X O O | X X O | X X X O O |
| 24 | O X O | O X O O O | X X X | X X O O O | O O X | O X O O X | X O O | X X O O X |
| 25 | X O X | X O O O O | X X O | X O O O X | O X O | X O O X O | O O X | X O O X X |
| 26 | O X X | O O O O X | X O O | O O O X X | X O X | O O X O X | O X O | O O X X X |
| 27 | X X X | O O O X O | O O X | O O X X O | O X X | O X O X O | X O X | O X X X O |
| 28 | X X O | O O X O O | O X O | O X X O O | X X X | X O X O O | O X X | X X X O O |
| 29 | X O O | O X O O O | X O X | X X O O O | X X O | O X O O X | X X X | X X O O X |
| 30 | O O X | X O O O O | O X X | X O O O X | X O O | X O O X O | X X O | X O O X X |
| 31 | O X O | O O O O X | X X X | O O O X X | O O X | O O X O X | X O O | O O X X X |
| 32 | X O X | O O O X O | X X O | O O X X O | O X O | O X O X O | O O X | O X X X O |
| 33 | O X X | O O X O O | X O O | O X X O O | X O X | X O X O O | O X O | X X X O O |
| 34 | X X X | O X O O O | O O X | X X O O O | O X X | O X O O X | X O X | X X O O X |
| 35 | X X O | X O O O O | O X O | X O O O X | X X X | X O O X O | O X X | X O O X X |
| | k | | k | | k | | k | |

Fig. 1

INVENTOR
PHILIP FIRE
BY F. J. Sullivan
ATTORNEY

Dec. 1, 1964 P. FIRE 3,159,810
DATA TRANSMISSION SYSTEMS WITH ERROR DETECTION AND CORRECTION CAPABILITIES
Filed March 21, 1960 4 Sheets-Sheet 2

DECODING TABLE k

| BIT # | P8 | P7 | P6 | P5 | P4 | P3 | P2 | P1 | |
|---|---|---|---|---|---|---|---|---|---|
| 1 | X | O | O | O | O | O | O | X | P1 |
| 2 | O | O | X | O | O | O | X | O | P2 |
| 3 | O | X | O | O | O | X | O | O | P3 |
| 4 | X | O | X | O | X | O | O | O | P4 |
| 5 | O | X | X | X | O | O | O | O | P5 |
| 6 | X | X | X | O | O | O | O | X | P6 |
| 7 | X | X | O | O | O | O | X | O | P7 |
| 8 | X | O | O | O | O | X | O | O | P8 |
| 9 | O | O | X | O | X | O | O | O | M1 |
| 10 | O | X | O | X | O | O | O | O | M2 |
| 11 | X | O | X | O | O | O | O | X | M3 |
| 12 | O | X | X | O | O | O | X | O | M4 |
| 13 | X | X | X | O | O | X | O | O | M5 |
| 14 | X | X | O | O | X | O | O | O | M6 |
| 15 | X | O | O | X | O | O | O | O | M7 |
| 16 | O | O | X | O | O | O | O | X | M8 |
| 17 | O | X | O | O | O | O | X | O | M9 |
| 18 | X | O | X | O | O | X | O | O | M10 |
| 19 | O | X | X | O | X | O | O | O | M11 |
| 20 | X | X | X | X | O | O | O | O | M12 |
| 21 | X | X | O | O | O | O | O | X | M13 |
| 22 | X | O | O | O | O | O | X | O | M14 |
| 23 | O | O | X | O | O | X | O | O | M15 |
| 24 | O | X | O | O | X | O | O | O | M16 |
| 25 | X | O | X | X | O | O | O | O | M17 |
| 26 | O | X | X | O | O | O | O | X | M18 |
| 27 | X | X | X | O | O | O | X | O | M19 |
| 28 | X | X | O | O | O | X | O | O | M20 |
| 29 | X | O | O | O | X | O | O | O | M21 |
| 30 | O | O | X | X | O | O | O | O | M22 |
| 31 | O | X | O | O | O | O | O | X | M23 |
| 32 | X | O | X | O | O | O | X | O | M24 |
| 33 | O | X | X | O | O | X | O | O | M25 |
| 34 | X | X | X | O | X | O | O | O | M26 |
| 35 | X | X | O | X | O | O | O | O | M27 |
| | k" | | | k' | | | | | |

r = 3
k = 8
k' = 5
k" = 3
M ≦ 27

Fig. 2

ENCODING TABLE

| | P1 | P2 | P3 | P4 | P5 | P6 | P7 | P8 |
|---|---|---|---|---|---|---|---|---|
| M1 | X | X | O | X | O | X | X | O |
| M2 | O | X | X | O | X | O | X | X |
| M3 | X | X | X | O | O | O | X | X |
| M4 | X | O | X | O | O | X | X | X |
| M5 | X | O | O | O | O | X | O | X |
| M6 | X | O | O | X | O | X | O | O |
| M7 | O | X | O | O | X | O | X | O |
| M8 | O | O | X | O | O | X | O | X |
| M9 | X | X | O | O | O | X | O | O |
| M10 | O | X | X | O | O | O | X | O |
| M11 | O | O | X | X | O | O | O | X |
| M12 | X | X | O | O | X | X | X | O |
| M13 | O | X | X | O | O | X | X | X |
| M14 | X | X | X | O | O | X | O | X |
| M15 | X | O | X | O | O | X | O | O |
| M16 | O | X | O | X | O | O | X | O |
| M17 | O | O | X | O | X | O | O | X |
| M18 | X | X | O | O | O | O | X | O |
| M19 | O | X | X | O | O | O | O | X |
| M20 | X | X | X | O | O | X | X | O |
| M21 | O | X | X | X | O | O | X | X |
| M22 | X | X | X | O | X | X | X | X |
| M23 | X | O | X | O | O | O | O | X |
| M24 | X | O | O | O | O | X | X | O |
| M25 | O | X | O | O | O | O | X | X |
| M26 | X | X | X | X | O | X | X | X |
| M27 | X | O | X | O | X | X | O | X |

Fig. 3

INVENTOR
PHILIP FIRE
BY F. J. Sullivan
ATTORNEY

INVENTOR
PHILIP FIRE
BY F. L. Sullivan
ATTORNEY

INVENTOR
PHILIP FIRE
BY F. I. Sullivan
ATTORNEY 3,159,810
Patented Dec. 1, 1964

3,159,810

DATA TRANSMISSION SYSTEMS WITH ERROR DETECTION AND CORRECTION CAPABILITIES

Philip Fire, Sunnyvale, Calif., assignor to Sylvania Electric Products Inc., a corporation of Delaware Filed Mar. 21, 1960, Ser. No. 16,278
4 Claims. (Cl. 340—146.1)

This invention is concerned with electronic data processing and communication systems, and particularly with the correction of transmission errors in such systems.

In pulse coded digital communication and data processing systems having either radio or closed circuit linkage, intelligence is transmitted and processed in the form of electric or electromagnetic impulses. For example, in binary coded communication systems messages may be comprised by the presence or absence, or by variations in the amplitude or polarity of signals representing the ONE's or ZERO's of a binary code. The reliability of these digital systems is affected by the extent to which noise and other interference distorts the impulse signals during transmission so that ONE's are mistaken for ZERO's and vice versa or to which phenomena such as momentary fading of radio frequency carriers at times delete digits or groups of digits from the attempted communication.

During the past ten years considerable mathematical analysis and research and development activity have been devoted to the problem of discovering and correcting these errors in received messages. Three basic approaches have been followed: the use of "code books" etc. at the receiver to verify what the incoming message should be; majority testing of redundant algebraic relationships amongst the digits of the received message to recreate the digit sequence of the original message; and, various parity checking techniques. Co-pending patent applications Serial No. 727,103, filed April 8, 1958, and Serial No. 842,549, now Patent No. 3,093,707, filed September 24, 1959, may be consulted for analyses of the present state of the art in this area and typical examples of the previously mentioned approaches to solution of the problem.

These prior art techniques have proved effective, but have generally followed a digit-by-digit approach to the solution of independent errors. As a practical matter, however, the errors in digital communications in many types of systems do not occur with relative independence. For example, impulse noise picked up on telephone lines, power line surges in station equipment, complex noise characteristics in amplifiers, atmospheric fading, finite specks of dust and other particles or faulty spots on magnetic tape, etc. generally cause drop-outs of successive digits or series bursts of erroneous digits.

Some of the previously referenced error correcting systems could be adapted to correct bursts of adjacent errors within certain limitations but only at the expense of serious redundancy, for example as much as three to one, in word length. Consequently, it is still a general practice to cope with errors by duplexing transmissions, a practice which requires either duplicate, and parallel operating, equipments or message repeats.

Accordingly, a primary object of this invention is to provide for electronic data processing and communication systems an error correcting technique which will correct burst type errors with a minimum of message redundancy. A related object is to provide an improved transmission technique for such systems.

These and related objects have been accomplished in one embodiment of the invention by following practices described in a publication entitled A Class of Multiple-Error-Correcting Binary Codes for Non-Independent Errors, by Philip Fire, published by Sylvania Electric Products Inc. at Mountain View, California, in April of 1959. This publication may be consulted for detailed analysis and mathematical demonstration of the theoretical aspects of the invention.

In one illustrative embodiment, the invention features the combination of a parity digit generator which performs an encoding function at a transmitting station and a pair of parity digit generators at a receiving station. The first of these generators produces a parity word which indicates the pattern of the error burst, if such occurs within the received word, and the second, in combination with the first, produces data which determines the location of this error pattern. Once the pattern and the location of the errors have been determined, correction is accomplished simply by modulo two addition (i.e. add without carry) of the parity and erroneous message digits.

As will be explained in the following discussion of this illustrative example of an error correcting system embodying the invention, the width of the error burst which may be corrected is a function of the number of parity digits employed. In the typical example to be described, a message word of twenty-seven digits is corrected for error bursts up to three digits wide with the addition of only eight parity digits. The relative number of parity digits required in proportion to message digits decreases significantly with the length of the word thus making it possible to provide transmission systems wherein information words of considerable length can be transmitted with very low redundancy and high reliability. This technique has applicability not only in point-to-point communication systems but also to devices such as computer input-output equipment where it can replace duplicate files of magnetic tape for error correcting purposes, provide a check for complete sets of punched card files by adding a few cards to the stack, compensate for worn gears in mechanical coders, etc.

Other features, embodiments, modifications, and uses for the invention will be apparent from the following description of the illustrative system previously referred to and reference to the following drawings, wherein:

FIG. 1 is a Table of Check Word Sequences;

FIG. 2 is a Decoding Parity Check Table;

FIG. 3 is an Encoding Parity Check Table;

Figure 4:
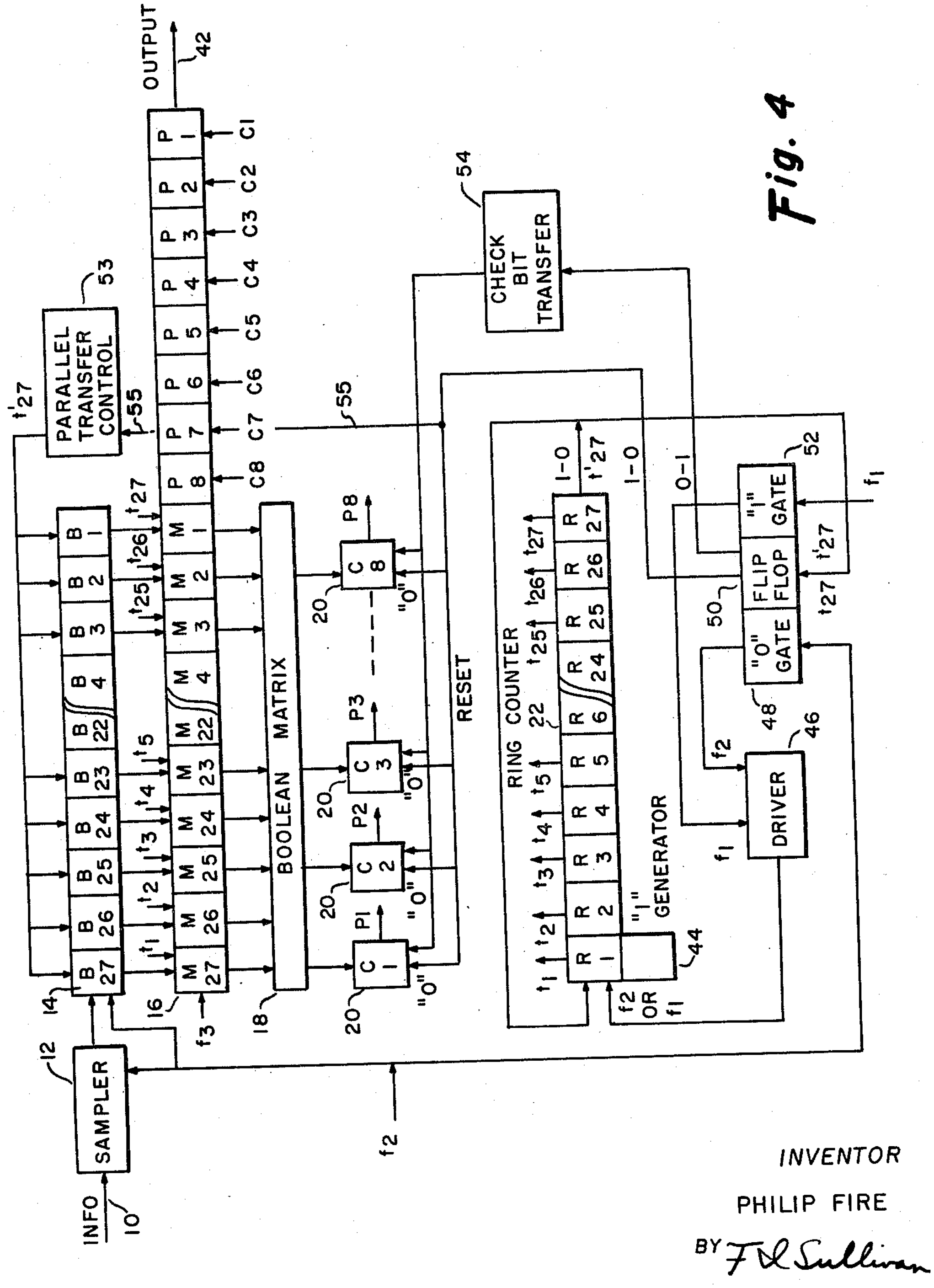
FIG. 4 is a block diagram of an error-correcting encoder.

To relieve this specification of undue theoretical analysis, a generalized description of the invention and its illustrative embodiment will be presented. A thoroughly comprehensive analysis of its theoretical and mathematical aspects is available in the Fire publication previously referenced.

As has been explained, a principal feature of the invention is its ability to correct bursts or errors in digital communications. This is accomplished by adding to the text of the original message a series of parity digits and subsequently decoding them in a specialized manner. The encoding logic which produces the parity digits is adapted to prescribe a series of modulo two additions of the individual message and parity digits in various combinations so that a parity word is formed for each message word. This parity word is the result of a separate parity check for each such digit to be transmitted.

A specified different parity checking procedure performed on all of the received digits produces a parity check word at the decoder. The procedure by which this word is obtained will be explained later in more detail, but a characteristic feature of the invention is that each of the check words is capable of being generated in the decoder of the system by a combination of two pulse shifting registers. In the illustrative embodiment of the invention to be described, one of these shifting registers has maximum sequence feedback connections and the other has non-maximum connections.

Maximum and non-maximum shift register sequences are thoroughly discussed in the Fire publication and the references cited therein. In brief, the maximum sequence generator is a shift register of $n$ stages having appropriate feedback connection from later stages back, through a modulo two adder, to its first stage so that the word represented by the digit content of its component stages changes for each shift pulse applied to the register and no word is repeated until the maximum number of words possible ($2^n-1$ because the case of all ZERO's is avoided) has been produced. A non-maximum sequence generator is a shift register of $n$ stages having such feedback connections that less than $2^n-1$ words are generated before the cycle is repeated. The particular non-maximum sequence used in these codes is a simple connection from its final to its first stage so that, in response to shift pulses, an $n$ stage register produces only $n$ words before repeating itself. In the table of FIG. 1 the three digit words $k''$ are examples of maximum sequences and the five digit words $k'$ are examples of non-maximum sequences.

In the embodiment of the invention under present discussion, these two types of sequences are combined as subwords to form a complete parity word ($k$ digits long) and are cycled through their respective disjoint periods to provide a maximum number of possible check words without repeating the same combination of individual digits. The sub-word $k'$ digits long produced by the non-maximum sequence is used first to recognize an error pattern, and the sub-word $k''$ digits long produced by a maximum sequence feedback connection is then used in combination with the non-maximum word to provide an error location word which is cycled through all of its possible permutations in unison with circulation of the received word, through its own register, until location of the error pattern, previously detected, has been established. At this point the erroneous digits are corrected by simple modulo two addition (binary add without carry) of the error pattern digits to the message digits in error.

A suitable procedure for applying the principles of the invention to the correction of error bursts in digital communications of a given word length follows:

(I) Provide a Table of Check Word Sequences wherein:

(*a*) Each digit of a transmitted word of the length desired (including message and parity digits) has assigned to it a separate combination of the available check word digits, i.e. a separate check word;

(*b*) These separate combinations each comprise two sub-groups one of which may be derived from a shift register having maximum sequence feedback connections and the other of which may be derived from a shift register having non-maximum sequence connections;

(*c*) The maximum sequence register has a number of stages ($k''$) equal to the width in number of digits ($n$) of error correcting capability desired; and (*d*) The non-maximum sequence register has a width in number of stages ($k'$) capable of accommodating unambiguously every possible shifted combination of error pattern digits desired to be corrected without repeating its data content.

Such a table is shown in FIG. 1 wherein four columns (A–D) each containing thirty-five no eight bit data words are shown. The words have a specialized bit content and pattern, as will be made more apparent, and eight bit combination occurs more than once in the table which provides for correcting up to three adjacent errors in the following combinations:

Column A—single errors (X)
Column B—adjacent double errors (XX)
Column C—three bit wide double errors (XOX)
Column D—triple adjacent errors (XXX)

The various blocks of digits which comprise the table indicate that it has been constituted by a series of disjoint relationships of a three digit wide maximum sequence and a five digit wide non-maximum sequence operating with different periodicities. The interrelation between the A, B, C, and D sequences is established as follows: $B_1=A_1\oplus A_2$; $C_1=A_1\oplus A_3$; and $D_1=A_1\oplus A_2\oplus A_3$.

(II) Derive from the Table of Check Word Sequences (FIG. 1) a Parity Check Table by assigning each of the possible check words in one column, e.g. A, to a separate digit (message or parity) of the word to be transmitted and identifying in some prescribed manner each vertical row of digits with a parity digit designation. An example of such a check table for thirty-five digit (27 message, M, and 8 parity, P) is shown in FIG. 2.

(III) Produce a set of linear simultaneous equations for the individual digits of the parity word by indicating modulo two addition of the positions checked down the columns under each of these digits (P1–P8 in the Table of FIG. 2), ignoring the check at the intersection of row and column assigned to the same parity digit. In the illustrative table of FIG. 2, this results in the following series of equations:

(1) $P_1=P_6\oplus M_3\oplus M_8\oplus M_{13}\oplus M_{18}\oplus M_{23}$
(2) $P_2=P_7\oplus M_4\oplus M_9\oplus M_{14}\oplus M_{19}\oplus M_{24}$
(3) $P_3=P_8\oplus M_5\oplus M_{10}\oplus M_{15}\oplus M_{20}\oplus M_{25}$
(4) $P_4=M_1\oplus M_6\oplus M_{11}\oplus M_{16}\oplus M_{21}\oplus M_{26}$
(5) $P_5=M_2\oplus M_7\oplus M_{12}\oplus M_{17}\oplus M_{22}\oplus M_{27}$
(6) $P_6=P_2\oplus P_4\oplus P_5\oplus M_1\oplus M_3\oplus M_4\oplus M_5\oplus M_8\oplus M_{10}\oplus M_{11}\oplus M_{12}\oplus M_{15}\oplus M_{17}\oplus M_{18}\oplus M_{19}\oplus M_{22}\oplus M_{24}\oplus M_{25}\oplus M_{26}$
(7) $P_7=P_3\oplus P_5\oplus P_6\oplus M_2\oplus M_4\oplus M_5\oplus M_6\oplus M_9\oplus M_{11}\oplus M_{12}\oplus M_{13}\oplus M_{16}\oplus M_{18}\oplus M_{19}\oplus M_{20}\oplus M_{23}\oplus M_{25}\oplus M_{26}\oplus M_{27}$
(8) $P_8=P_1\oplus P_4\oplus P_6\oplus P_7\oplus M_3\oplus M_5\oplus M_6\oplus M_7\oplus M_{10}\oplus M_{12}\oplus M_{13}\oplus M_{14}\oplus M_{17}\oplus M_{19}\oplus M_{20}\oplus M_{21}\oplus M_{24}\oplus M_{26}\oplus_{27}$ (IV) Employing Boolean techniques, minimize these equations to provide a Parity Digit Encoding Table. The preceding equations may be so minimized, to provide the Encoding Table of FIG. 3, in the following manner.

It is necessary to solve for each $P_i$ ($i=1, 2, \ldots 8$) in terms of only the $M_j$ ($j=1, 2, \ldots 27$). In the above equations $P_4$ and $P_5$ are already in the required form. Hence, we must solve for $P_1$, $P_2$, $P_3$, $P_6$, $P_7$, and $P_8$. Coefficients are reduced to modulo–2, i.e., an even number is equal to ZERO and an odd number is equal to ONE.

Substituting for $P_4$ and $P_5$ from Equations 4 and 5, and putting all the remaining $P_i$ on the left side, one gets:

(1*a*) $P_1\oplus P_6=M_3\oplus M_8\oplus M_{13}\oplus M_{18}\oplus M_{23}$
(2*a*) $P_2\oplus P_7=M_4\oplus M_9\oplus M_{14}\oplus M_{19}\oplus M_{24}$
(3*a*) $P_3\oplus P_8=M_5\oplus M_{10}\oplus M_{15}\oplus M_{20}\oplus M_{25}$
(6*a*) $P_2\oplus P_6=M_2\oplus M_3\oplus M_4\oplus M_5\oplus M_6\oplus M_7\oplus M_8\oplus M_{10}\oplus M_{15}\oplus M_{16}\oplus M_{18}\oplus M_{19}\oplus M_{21}\oplus M_{24}\oplus M_{25}\oplus M_{27}$ (7a) $P_3 \oplus P_6 \oplus P_7 = M_4 \oplus M_5 \oplus M_6 \oplus M_7 \oplus M_9 \oplus M_{11} \oplus M_{13} \oplus M_{16} \oplus M_{17} \oplus M_{18} \oplus M_{19} \oplus M_{20} \oplus M_{22} \oplus M_{23} \oplus M_{25} \oplus M_{26}$ (8a) $P_1 \oplus P_6 \oplus P_7 \oplus P_8 = M_1 \oplus M_3 \oplus M_5 \oplus M_7 \oplus M_{10} \oplus M_{11} \oplus M_{12} \oplus M_{13} \oplus M_{14} \oplus M_{16} \oplus M_{17} \oplus M_{19} \oplus M_{20} \oplus M_{24} \oplus M_{27}$ Adding (7*a*) and (8*a*), one gets:

(7c) $P_1 \oplus P_3 \oplus P_8 = M_1 \oplus M_3 \oplus M_4 \oplus M_6 \oplus M_9 \oplus M_{10} \oplus M_{12} \oplus M_{14} \oplus M_{18} \oplus M_{22} \oplus M_{23} \oplus M_{24} \oplus M_{25} \oplus M_{26} \oplus M_{27}$ Now, (3*a*) added to (7*c*) gives:

(1c) $P_1 = M_1 \oplus M_3 \oplus M_4 \oplus M_5 \oplus M_6 \oplus M_9 \oplus M_{12} \oplus M_{14} \oplus M_{15} \oplus {}_{18} \oplus M_{20} \oplus M_{22} \oplus M_{23} \oplus M_{24} \oplus M_{26} \oplus M_{27}$ Adding (1*a*) and (1*c*) gives:

(6c) $P_6 = M_1 \oplus M_4 \oplus M_5 \oplus M_6 \oplus M_8 \oplus M_9 \oplus M_{12} \oplus M_{13} \oplus M_{14} \oplus M_{15} \oplus {}_{20} \oplus M_{22} \oplus M_{24} \oplus M_{26} \oplus M_{27}$ Adding (6*c*) and (6*a*) gives:

(2c) $P_2 = M_1 \oplus M_2 \oplus M_3 \oplus M_7 \oplus M_9 \oplus M_{10} \oplus M_{12} \oplus M_{13} \oplus M_{14} \oplus M_{16} \oplus M_{18} \oplus M_{19} \oplus M_{20} \oplus M_{21} \oplus M_{22} \oplus M_{25} \oplus M_{26}$ Adding (2*a*) and (2*c*) gives:

(7d) $P_7 = M_1 \oplus M_2 \oplus M_3 \oplus M_4 \oplus M_7 \oplus M_{10} \oplus M_{12} \oplus M_{13} \oplus M_{16} \oplus M_{18} \oplus M_{20} \oplus M_{21} \oplus M_{22} \oplus M_{24} \oplus M_{25} \oplus M_{26}$ Adding (7*a*) to (6*c*) plus (7*d*) gives:

(3d) $P_3 = M_2 \oplus M_3 \oplus M_4 \oplus M_8 \oplus M_{10} \oplus M_{11} \oplus M_{13} \oplus M_{14} \oplus M_{15} \oplus M_{17} \oplus M_{19} \oplus M_{20} \oplus M_{21} \oplus M_{22} \oplus M_{23} \oplus M_{26} \oplus M_{27}$ And finally, adding (3*d*) to (3*a*) gives:

(8d) $P_8 = M_2 \oplus M_3 \oplus M_4 \oplus M_5 \oplus M_8 \oplus M_{11} \oplus M_{13} \oplus M_{14} \oplus M_{17} \oplus M_{19} \oplus M_{21} \oplus M_{22} \oplus M_{23} \oplus M_{25} \oplus M_{26} \oplus M_{27}$ (V) Provide, for the instrumentation of the encoder, a Boolean matrix embodying the Encoding Table of FIG. 3.

(VI) Provide for the decoder a similar matrix in reverse direction but including, instead of ignoring, the intersection of rows and columns identified by the same parity digit designation as in FIG. 2. This last step will result in a series of ZERO's for a decoder check word if there have been no transmission errors and a ONE in appropriate digit positions to indicate errors.

(VII) Accept the message if the decoder generated parity word is all ZERO's.

(VIII) Cycle the parity sub-word generators to determine error pattern and location, in a manner to be explained, if the decoder parity word contains one or more ONE's.

(IX) Correct the located errors and accept the message.

Figure 5:
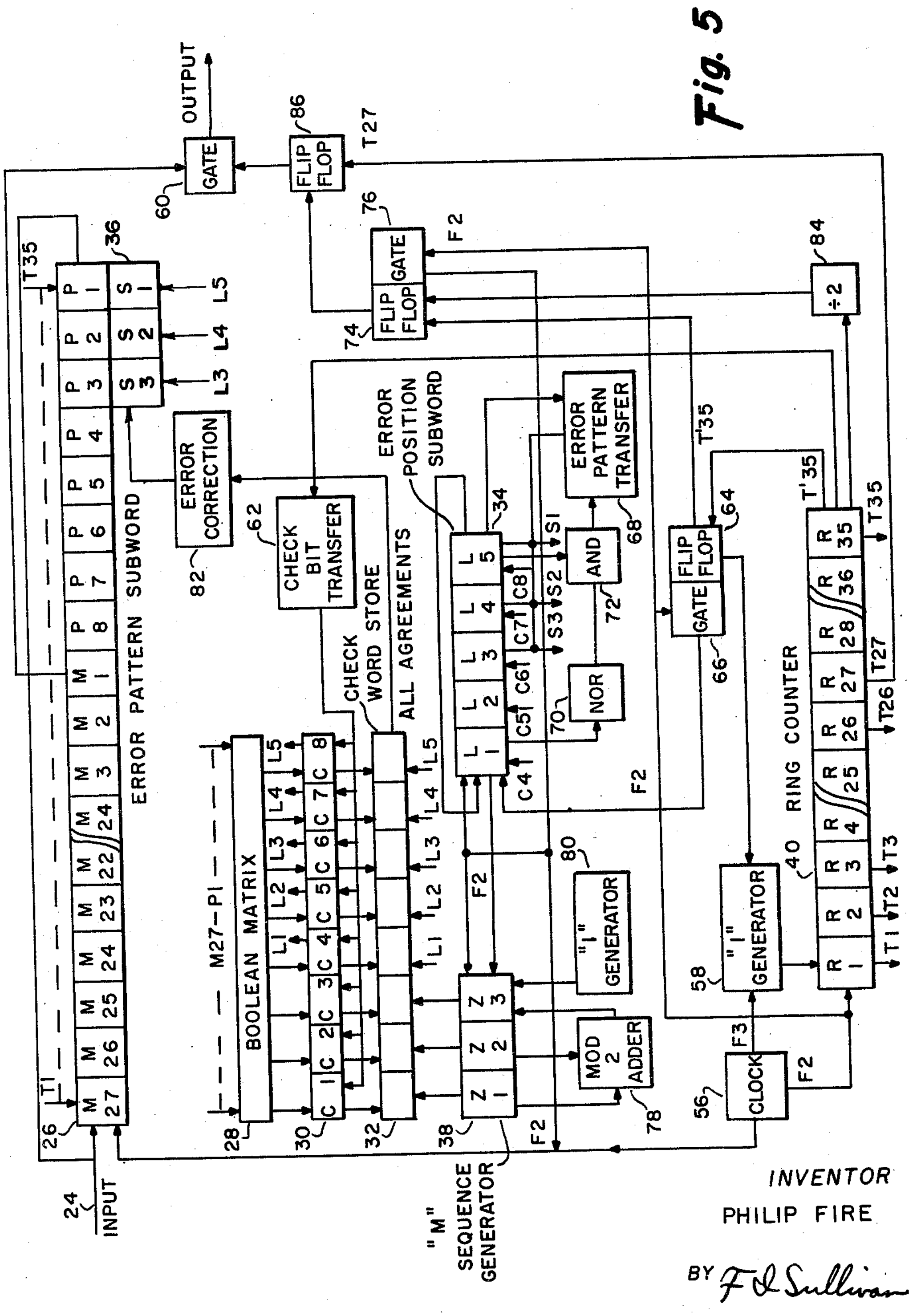
FIG. 5 is a block diagram of a decoder, illustrating the invention.

An illustrative instrumentation system for encoding messages of a twenty-seven binary digit length and decoding them with a capability of correcting errors in bursts up to three digits wide is illustrated in FIGS. 4 and 5.

The encoder of FIG. 4 includes: a source 10 of message information; a sampler 12 for converting this data into a series of occurrences and non-occurrences of synchronized electrical impulses representing the ONE's and ZERO's of a binary coded information system; a twenty-seven digit buffer register 14 arranged to accept data in serial form from the sampler 12 and store it in parallel stages B1–B27; a logic line 16 in the form of a register having thirty-five stages (M1–M27 and P1–P8) for storing the message digits while parity digits are generated and for arranging the sequence of parity and message digits for ultimate transmission; a matrix 18 including the necessary Boolean circuitry for minimizing the amount of modulo two addition which must be performed to implement the encoding process; a series of flip-flop devices 20 having complementing inputs from the matrix

18 so as to have the capability of performing the modulo two additions required to generate the parity digits P1–P8; and, a ring counter 22 for sequencing the operations of the encoding process.

The decoder of FIG. 5 includes an input 24 whence the received message and parity digits are derived; a pulse shifting register 26 for storing these digits during the decoding process; a Boolean matrix 28 for implementing the decoding operation; a parity digit generator 30 including a series of flip-flops C1–C8 each having a complementing input from the Boolean matrix 28 so as to permit them to perform the modulo two addition required to form a decoder "check word"; a check word store 32; an error position store 34; an error pattern store 36; an error location generator 38; and, a ring counter 40 for sequencing the operations of the decoder.

*Encoding Operation*

In the operation of the encoder (FIG. 4) timing inputs (provided by a suitable clock system, not shown) are provided at sequences of *f1*, *f2*, and *f3*. *f2* is the information input bit rate, e.g. 100 bits per second; *f3* is equal to $$\frac{35}{27} f2$$

so that an output character (twenty-seven information bits plus eight check bits) may be driven serially from the register 16 during the same time interval that an input character (twenty-seven information bits only) enters the register 14; *f1* provides pulses in a cycle greater than 35 *f3* so that a complete parity check involving serial operation on each one of thirty-five digits may be accomplished in the period between the output of the last character in a message word shifted from register 16 via output terminal 42 and the first bit of the next character without changing the output bit rate.

The message information arriving at terminal 10 is sampled at the bit rate (*f2*) by the sampler 12 and stored in the buffer line. At this time, a ONE produced by generator 44 is inserted into the first stage R1 of ring counter 22 and is driven, at the bit rate, by *f2* pulses transmitted to the ring counter driver 46 via the ZERO gate 48 of a flip-flop device 50 which is assumed to be in ZERO condition.

After twenty-seven *f2* pulses, at time *t'27* when the register 14 has been loaded with the twenty-seven digits of the message character, the ONE moving down the sequential stages of ring counter 22 is shifted from its final stage R27. This ZERO to ONE transition complements the flip-flop 50 to its ONE condition, thereby inactivating its ZERO gate 48 and energizing its ONE gate 52 and also RESETTING the parity check flip-flops 20 to ZERO condition and transferring the message digits from the buffer register 14 to the logic line 16 via operation of parallel transfer control 53 energized via control line 55.

With the opening of the ONE gate 52 and closing of the ZERO gate 48, the driver 46 drives the ring counter 22 at an *f1* rate and, as it drives the one which has been reinserted into its first stage R1 down the counter, produces serial pulses at the outputs *t1–t27*. Each of these pulses is consecutively applied to the digits D27–D1 in the logic line 16 and seeks coincidence with a ONE stored in the respective logic line stage to which they are connected. When such coincidence occurs, a pulse is transmitted through the matrix 18 to the appropriate flip-flop 20 which the encoding system requires for the generation of the appropriate one of the parity digits P1–P8 concerned. The configuration of this matrix is established by reference to the encoding table of FIG. 2 in accordance with the procedure previously explained.

When the ONE in the ring counter reaches stage 27 this second time, the flip-flop 50 is again complemented, this time to its ZERO condition. This transition inactivates the ONE gate 52 and energizes the ZERO gate 48. It also activates the check bit transfer control 54 to cause the flip-flops 20 containing the parity digits to transfer them to the appropriate stages P1–P8 in the logic storage line 16.

The sequence is now repeated with *f3* pulses overlapping *f2* pulses so that the shift register 16 is cleared of the digit sequence to be transmitted via output 42 as the buffer register 14 is loaded with message digits obtained from the sampler 12.

*Decoding Operation*

In the operation of the decoder (FIG. 5) a suitable clock 56 provides timing pulses as follows: F1, the bit rate of the received information; F2, the processing rate of the decoder which may be approximately 100 F1; and, F3 which is the "received word" rate, equal to F1/35.

Input data arriving at terminal 24 is received sequentially and shifted into the various stages of register 26 at an F1 bit rate. After the thirty-five bits of word data (parity digits P1–P8 and message digits M1–M27) have been received and stored, an F3 pulse occurs.

The F3 pulse causes the ONE generator 58 to insert a ONE into the first stage R1 of ring counter 40. This counter is driven by F2 pulses; and, as the ONE is circulated through it, pulses at T1–T35 are generated at the individual outputs of its thirty-five stages. As each one of these T1–T35 pulses is generated it seeks coincidence with a ONE in the individual stage of register 26 to which it is connected. When such coincidence occurs, a pulse is sent to the appropriate flip-flop C1–C8 of the parity digit generator 30 via Boolean matrix 28. This matrix has been arranged, in the manner previously explained, to accomplish the required modulo two addition for producing the decoder check word by connecting the various message and parity digits contained in the register 26 to the complementing inputs of the individual flip-flops C1–C8 of the parity word generator 30. If the check word thus generated is all ZERO's no errors have been detected in the received word and gate 60 is energized to accomplish readout of the message digits M1–M27 from the register 26.

Upon the generation of pulse T35, if there are any ONE's instead of all ZERO's in the check word generator 30, the check bit transfer control 62 is energized to transfer the various digits of the check word from their respective flip-flops C1–C8 to corresponding stages of the check word store 32. At the same time the last five digits of the word are transferred from flip-flops C4–C8 of the generator 30 into stages L1–L5, respectively, of the error sub-word shifting register 34. At this time, the flip-flop 64 is also complemented to energize gate 66.

With gate 66 energized, pulses at rate F2 drive the register 34 until there is a ONE in position L5 and ZERO's in positions L1 and L2. When this occurs, the digits stored in stages L3, L4, and L5 are transferred, under the control of the error pattern transfer 68 responding to a combination of signals from NOR gate 70 and AND gate 72, to stages S3, S2, and S1, respectively, of the error pattern sub-word store 36. Flip-flop 64 is, at this time, RESET by a signal from the AND gate 72 to de-energize gate 66 thereby disconnecting this source of driving pulses F2 and energizing the ONE generator 58 to insert a ONE into stage R1 of the ring counter 40. This transition of flip-flop 64 also complements flip-flop 74 to energize gate 76 and now apply the F2 driving pulses simultaneously to registers 34 and 38.

The non-maximum sequence generator 34 and maximum sequence generator 38 are now driven in unison with each other and with the register 26 at the F2 rate. Registers 34 and 26 are operating with a simple feedback connection from their final into their first stage so that their data is simply recirculating. Register 38, however, is operated with appropriate feedback connections through a modulo two adder 78 to provide a maximum sequence of digit combinations. The initial contents of the register 38 when this sequencing operation is started consists, in its stages Z1, Z2, and Z3, of a combination of ZERO's and ONE's provided by the ONE generator 80 and control connections (not shown) to conform with the initial *k''* sequence sub-word of the A–D group (FIG. 1) to which the particular type of *k'* sub-word contained in stages L3, L4, and L5 of register 34 belongs, i.e. whether it is a one, two or three digit group.

The combination of registers 38 and 34 is now producing the various check words of the Table of Check Word Sequences in FIG. 1. The shifting process cycles these registers through their sequence of possible words until the word they generate coincides digit for digit with the check word stored in register 32. When this coincidence occurs the error correction gate 82 is energized to cause the error pattern sub-word stored in stages S1–S3 of register 36 to be added modulo two to the contents of corresponding stages P3–P1 of the register 26. This driving pulses continue until a pulse at T35 indicates that the message word stored in register 26 has been driven full cycle and its first digit is again located in stage M1 of the register, its second digit in stage M2, etc. At this time, the ÷2 circuit 84, which was partially energized by the first pulse T35 is now fully energized and complements the flip-flop 74 thereby de-energizing gate 76 and complementing flip-flop 86 to energize the gate 60 for read-out of the message digits. Flip-flop 64 has been complemented by pulse T35 to cause another ONE to start circulating through ring counter 40 and flip-flop 86 which controls the operation of gate 60, remains energized until T27 to accommodate the shift-out of the twenty-seven digits of the corrected message from register 26.

It should be noted that the error checking process involved herein is cyclic as distinguished from iterative in the language of this art wherein an iterative check is performed by operating upon the digits of different rows or columns in corresponding different directions through a static matrix arrangement of the component digits and a cyclic check is performed by operating upon different digits as occupying certain selected positions as the message is shifted through a matrix. A typical example of error correcting which features principles of this invention is as follows.

Assume: A twenty-seven digit message and a desired capability of correcting transmission errors in bursts up to three digits wide; an operating system utilizing the encoding and decoding tables and the equipments which have been described; and, the following sequence of message digits (M1–M27) at the information input to the decoder of FIG. 4.

| | | | | | | | | | | | | |
|---|---|---|---|---|---|---|---|---|---|---|---|---|
| M1 | M2 | M3 | M4 | M5 | M6 | M7 | M8 | M9 | M10 | M11 | M12 | M13 |
| 1 | 0 | 0 | 1 | 1 | 0 | 1 | 1 | 1 | 0 | 1 | 0 | 0 |
| M14 | M15 | M16 | M17 | M18 | M19 | M20 | M21 | M22 | M23 | M24 | M25 | |
| 0 | 1 | 0 | 1 | 1 | 0 | 1 | 0 | 1 | 1 | 0 | 0 | |
| M26 | M27 | | | | | | | | | | | |
| 1 | 1 | | | | | | | | | | | |

This sequence of digits passes, via the sample 12, to stages B1–B27 of the buffer storage 14 and thence to stages M1–M27 of the logic line 16. Here, each digit stage is pulsed sequentially by the inputs *t1*–*t27* derived from the ring counter 22 and, in accordance with the control circuitry of the Boolean matrix 18, complements selected ones of the parity digit generating flip-flop circuits 20 if there is a 1 in each digit stage M1–M27 as it is energized.

After all twenty-seven of the message digits have been sensed and made their contribution to the generation of the parity digits, the following parity check word results:

| P1 | P2 | P3 | P4 | P5 | P6 | P7 | P8 |
|---|---|---|---|---|---|---|---|
| 1 | 1 | 0 | 1 | 0 | 0 | 1 | 1 |

These eight parity digits are transferred to stages P1–B8 of the logic line 16 and the following sequence of digits is transmitted.

| | | | | | | | | |
|---|---|---|---|---|---|---|---|---|
| Bit No. | 1(P1) | 2(P2) | 3(P3) | 4(P4) | 5(P5) | 6(P6) | 7(P7) | 8(P8) |
| | 1 | 1 | 0 | 1 | 0 | 0 | 1 | 1 |
| Bit No. | 9(M1) | 10(M2) | 11(M3) | 12(M4) | 13(M5) | 14(M6) | 15(M7) | |
| | 1 | 0 | 0 | 1 | 1 | 0 | 1 | |
| Bit No. | 16(M8) | 17(M9) | 18(M10) | 19(M11) | 20(M12) | 21(M13) | | |
| | 1 | 1 | 0 | 1 | 0 | 0 | | |
| Bit No. | 22(M14) | 23(M15) | 24(M16) | 25(M17) | 26(M18) | 27(M19) | | |
| | 0 | 1 | 0 | 1 | 1 | 0 | | |
| Bit No. | 28(M20) | 29(M21) | 30(M22) | 31(M23) | 32(M24) | 33(M25) | | |
| | 1 | 0 | 1 | 1 | 0 | 0 | | |
| Bit No. | 34(M26) | 35(M27) | | | | | | |
| | 1 | 1 | | | | | | |

If I assume that transmission errors occur in message digits M9–M11, the thirty-five digits which comprise the data processing word arriving at the input terminal 24 of the decoder of FIG. 5 are the same as those transmitted above with the exception that bit 17 is changed from a 1 to a 0, bit 18 is changed from a 0 to a 1, and bit 19 is changed from a 1 to a 0. This represents a three digit wide error burst wherein message digits 101 are changed to 010.

If there had been no errors in the received message word, the decoder Boolean matrix 28, which embodies the decoding table of FIG. 2, would result in eight 0's in the parity check digit generating flip-flops 30. Since, however, in our example bits 17, 18, and 19 have been erroneously received as specified above, the parity word generated in the flip-flops 30 instead of being all 0's is as follows:

| P1 | P2 | P3 | P4 | P5 | P6 | P7 | P8 |
|---|---|---|---|---|---|---|---|
| 1 | 0 | 0 | 0 | 1 | 1 | 1 | 0 |

This word is transferred to the check word store 32 and its last five digits (P4–P8) are transferred into stages L1–L5, respectively, of the error position sub-word 34. This register is now shifted until its first two stages contain 0's and its final stage contains a 1. In our example its contents will then read

| L1 | L2 | L3 | L4 | L5 |
|---|---|---|---|---|
| 0 | 0 | 1 | 1 | 1 |

The three adjacent 1's in register 34 indicate that the pattern of the error received is three adjacent erroneous digits, and these three 1's indicating this pattern are transferred to stages S1, S2, and S3 of the error pattern sub-word register 36.

Since the error pattern of three adjacent 1's indicates that the check word sequence of Column D in FIG. 1 is applicable, three 1's, to conform with the initial $k''$ word of this column, are inserted in stages Z1–Z3, respectively, of the "M" sequence generator 38 and appropriate control circuitry is energized to cause the maximum sequence generator 38 and the non-maximum sequence generator 34 to shift in unison through all of their thirty-five possible disjoint relationships set forth in Column D of FIG. 1 commencing with their initial setting of: 11100111.

After each shift the contents of these two registers 38 and 34 are compared digit for digit with the decoder parity word stored in register 32 and the contents of the register 26 is simultaneously shifted one stage to the right with a recirculating feedback connection from stage P1 to M27. When bits 17, 18, and 19 of the received word corresponding to bits M9, M10, and M11 of the original message are in alignment, respectively, with stages S1, S2, and S3 of the error pattern sub-word register 36, i.e. in the original position of bits P1–P3, the combined contents of registers 38 and 34 read as follows: 10001110 which is the seventeenth check word in sequence D of FIG. 1 and also a digit-for-digit coincidence with the decoder parity check word stored in register 32.

This coincidence causes the error pattern digits in stages S1–S3 of register 36 to be added modulo two to the erroneously received digits M9, M10, and M11 thereby changing them from the pattern of 010 to their original correct form of 101. Thus, the three digit wide transmission error is corrected and the originally encoded message is derived from the decoder via the output gate 60.

An error correcting system has been described with reference to specific types of code and equipment and an illustrative example of a thirty-five digit transmission word wherein twenty-seven message digits are contained and error bursts up to three digits wide are corrected. The invention, however, has broader applicability. For example, the parity digits may be interspersed throughout the transmitted word instead of being concentrated at its beginning or end, the proportion of parity digits to message digits may be increased or decreased to provide greater or lesser error correcting capability if desired, and the message word itself may be lengthened or shortened. Also, the operation of the encoding and decoding equipment may be varied by changing the initial condition of the location sub-word, the logic and/or shift direction of the sub-word registers, the initial digital make-up of the check words, the particular relationship between A, B, C, and D words, etc. Some of these alternatives are discussed in the Fire publication referenced and others will be apparent to those skilled in the art. The invention, however, is not limited to the specifics of either the present description or the publication but embraces the full scope of the following claims.

In the following claims, the term "convolutional" is employed to specify a particular type of signal processing in digital data error detecting and correcting techniques and apparatus. As explained by Peter Elias in the Transactions of the IRE, 1954 Symposium on Information Theory, September 1954, and the IRE 1955 National Convention Record, volume III, Part 4, and also in copending U.S. patent application, Serial No. 727,103, filed April 8, 1958, by Stanley A. Fierston et al. and assigned to Sylvania Electric Products Inc. (on page 4), convolutional parity checking and error detecting or correcting systems provide a continuous bit-by-bit check on the digits of messages being processed by using previously checked digits to verify subsequently processed digits. Thus, in a convolutional technique for processing digits in such a system, every digit is processed through every single position in the matrix; and, while it is in each position, it is checked against various combinations of other digits in the matrix for parity. It is a significant feature of the present invention as it is set forth in the following claims that it pertains only to "convolutional" systems.

What is claimed is:

1. For an electronic data processing system wherein information is processed in the format of digital sequences of binary coded electronic signals and said sequences include message digits and parity digits generated by convolutional processing of said message digits, error correcting apparatus including a decoder for said sequences, which decoder comprises: matrix means for processing said sequences in a cyclic parity-digit-generating operation wherein each message and each parity digit of said sequence is processed through each position of said matrix and is checked against other message and parity digits of said sequence in a separate operation for each position of said matrix to provide electronic signal indication of erroneous digits in said sequence; storage means, connected to said matrix means, for storing said indications of erroneous digits; first pulse shifting register means connected to said storage means for processing binary signal indication of the pattern of occurrence of said erroneous digits; second pulse shifting register means connected to said first shift register means for indicating, in combination with said first shift register means, the location of said erroneous digits within a given format; means for cycling said first and said second shift register means to achieve a desired relationship between the signal contents of said registers and said storage means; and, means responsive to said achievement of said relationship for implementing correction of erroneous digits in said sequences.

2. The invention according to claim 1 wherein said first and said second shift register means each have a different periodicity.

3. The invention according to claim 2 wherein one of said shift register means is a maximum sequence apparatus and the other of said shift register means is a non-maximum sequence apparatus.

4. The invention according to claim 3 wherein said means for implementing correction comprises means for performing sum-modulo-two addition of said pattern of error signals and said erroneous digit signals.

References Cited in the file of this patent

UNITED STATES PATENTS

| | | |
|---|---|---|
| 2,552,629 | Hamming et al. | May 15, 1951 |
| 2,956,124 | Hagelbarger | Oct. 11, 1960 |
| 3,037,697 | Kahn | June 5, 1962 |

OTHER REFERENCES

Elias, Peter: Coding for Noisy Channels; IRE Convention Record, Part 4, 1955, pp. 37–46.

Green, J. H., Jr., et al.: An Error-Correcting Encoder and Decoder of High Efficiency; Proceedings of the IRE, October 1958, pp. 1741–1744.

Feinstein, Amiel: Foundations of Information Theory; McGraw-Hill Book Co., Inc., New York, 1958, pp. 120–131.